(12) United States Patent
Leventhal (10) Patent No.: US 8,474,760 B2
(45) Date of Patent: Jul. 2, 2013

(54) POLYGONAL SUPPORT STRUCTURE

(76) Inventor: Stephen Leventhal, Ashton, MD (US)

( * ) Notice: Subject to any disclaimer, the term of this patent is extended or adjusted under 35 U.S.C. 154(b) by 341 days.

(21) Appl. No.: 13/049,062

(22) Filed: Mar. 16, 2011

(65) Prior Publication Data

US 2012/0234980 A1    Sep. 20, 2012

(51) Int. Cl.
*B64G 1/00* (2006.01)

(52) U.S. Cl.
USPC .................................. 244/159.5; 244/159.4

(58) Field of Classification Search
USPC ................. 244/159.5, 159.4; 52/645, 646
See application file for complete search history.

(56) References Cited

U.S. PATENT DOCUMENTS

| | | | | |
|---|---|---|---|---|
| 3,332,640 | A * | 7/1967 | Nesheim | 244/159.5 |
| 3,348,352 | A * | 10/1967 | Cummings | 52/646 |
| 3,478,986 | A * | 11/1969 | Fogarty | 244/159.4 |
| 4,057,207 | A * | 11/1977 | Hogan | 244/159.4 |
| 4,058,945 | A * | 11/1977 | Knapp | 52/244 |
| 4,318,517 | A | 3/1982 | Salkeld et al. | |
| 4,465,321 | A | 8/1984 | Berg | |
| 4,475,323 | A | 10/1984 | Schwartzberg et al. | |
| 5,580,013 | A * | 12/1996 | Velke | 244/159.5 |
| 6,028,570 | A | 2/2000 | Gilger et al. | |
| 6,150,995 | A | 11/2000 | Gilger | |
| 6,233,880 | B1 | 5/2001 | Sogame et al. | |
| 6,439,508 | B1 * | 8/2002 | Taylor | 244/158.3 |
| 6,441,801 | B1 | 8/2002 | Knight et al. | |
| 6,618,025 | B2 | 9/2003 | Harless | |
| 7,575,199 | B2 | 8/2009 | D'ausilio et al. | |
| 7,641,151 | B2 | 1/2010 | Janhunen | |
| 7,686,255 | B2 | 3/2010 | Harris | |
| 7,963,084 | B2 * | 6/2011 | Merrifield et al. | 52/646 |
| 8,371,088 | B2 * | 2/2013 | Merrifield | 52/646 |
| 2007/0044415 | A1 | 3/2007 | Merrifield et al. | |
| 2008/0111031 | A1 * | 5/2008 | Mobrem | 244/172.6 |

FOREIGN PATENT DOCUMENTS

| | | |
|---|---|---|
| EP | 959524 A1 | 11/1999 |
| EP | 984511 A2 | 3/2000 |
| GB | 2063959 A | 6/1981 |
| JP | 06099895 A | 4/1994 |
| WO | WO 9819911 A2 | 5/1998 |

* cited by examiner

*Primary Examiner* — Christopher P Ellis
(74) *Attorney, Agent, or Firm* — Steve Witters; Witters & Associates (57) ABSTRACT

A polygonal support structure is disclosed herein. The polygonal support structure has a plurality of rigid segments configured to be joined at longitudinal ends by a joint affixed to at least one end of each rigid segment. Each joint is configured to rigidly, rotatingly or hingedly join each rigid segment to an adjacent rigid segment to form the polygonal support structure. A plurality of flexible members are configured and disposed to provide tension between each joint and joints spaced two segments therefrom, in each direction, about the polygonal support structure. One or more joints may be configured to join and un-join two adjacent rigid segments and each rigid segment and each joint may be configured to enable stacking of rigid segment into a compact configuration for transport. In at least one aspect, a polygonal support structure may be configured to support assemblies in a substantially weightless environment.

20 Claims, 9 Drawing Sheets

POLYGONAL SUPPORT STRUCTURE

FIELD OF THE DISCLOSURE

This disclosure relates generally to support structures and particularly to support structures which may be configured to fold or collapse for transport and which may be deployed to provide a polygonal support structure.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

There have been many attempts to design folding, flexible, or collapsible support structures such as truss and scaffolding systems which may transition between a retracted and a deployed state. Additionally, the concept of providing a support structure that may induce artificial gravity in low or zero gravity environment has been contemplated for some time. However, little is known about support structures configured to be folded or collapsed for transport and deployed in a low or zero gravity environment and configured to induce artificial gravity to assemblies attached to the support structure.

The prior art discloses several structures configured to induce artificial gravity in a low or zero-gravity environment. For example, toroidal satellites with centrals hubs and radial spokes have been designed as have tethered space craft. A space station disposed to rotate around a hub and having a power plant, an observatory, and an air lock has been disclosed. It has also been proposed to tether ships together and set into rotation to provide living quarters having artificial gravity.

However, many of the prior art designs may involve assembly in orbit, with little or no prefabrication on the ground. Consequently, the designs may often be rather monolithic and may lack modularity. Additionally, prior art structures may have undesirable characteristics including undue complexity, inability to move in a coordinated and synchronous manner, lack of compactability, reconfigurability, and multi-functional uses, and high costs.

What is needed is a support structure that overcomes some of the obstacles associated with currently available support structures.

SUMMARY

In one aspect of the present disclosure, a polygonal support structure comprises a plurality of rigid segments wherein each rigid segment is configured to be joined at longitudinal ends to adjacent rigid segments. A joint is affixed to at least one end of each rigid segment, each joint is configured to rotatingly join each rigid segment to an adjacent rigid segment to form the polygonal support structure. At least two flexible members are configured and disposed to provide tension between each joint and joints spaced two segments therefrom, in each direction, about the polygonal support structure.

In another aspect of the present disclosure, a polygonal support structure comprises a plurality of rigid segments, each rigid segment is configured to support one or more assemblies. The polygonal support structure also comprises a plurality of joints, each joint is configured to join two of the plurality of rigid segments together to form the polygonal support structure.

In a further aspect of the present disclosure, a circular support structure comprises a plurality of rigid segments and a plurality of joints, each joint is configured and disposed to join two adjacent rigid segments to form the circular support structure. The circular support structure also comprises a plurality of flexible members configured and disposed to provide tension between each joint and at least joints spaced two segments therefrom, in each direction, about the circular support structure.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION

Reference will now be made in detail to the present exemplary embodiments and aspects of the present invention, examples of which are illustrated in the accompanying figures. Wherever possible, the same reference numbers will be used throughout the figures to refer to the same or like parts.

Aspects of the present disclosure provide a support structure comprising a plurality of rigid segments wherein each segment is joined at a longitudinal ends to adjacent segments. The segments may be rotatingly joined, e.g. with a ball and socket, hingedly joined, e.g. with a hinge, or fixed to adjacent segments to form a circular or polygonal structure. In at least one aspect, each segment is linear or planar. In at least one other aspect, each rigid segment may be disposed in a substantially common plane. In at least one additional embodiment, each segment has a substantially equal length.

Each joint may have at least two flexible members, such as cables, configured and disposed to provide tension between each joint and joints spaced two segments therefrom, skipping one joint in each direction, about the circular or polygonal structure. Additionally, more than one flexible member may extend from a joint or proximate a joint toward joints in a common circumferential direction about the support structure. No flexible member need extend through the center axis of the structure. The flexible members may be disposed in a substantially common plane.

In another aspect of the present disclosure, a support structure may be described as a form of tensegrity structure, a type of structure with an integrity based on a balance between tension and compression components. However, in at least one aspect, the rigid segments may not be in compression and the flexible members may not be in tension. Additionally, unlike a typical tensegrity having an outer perimeter comprising flexible members, the flexible members of the present disclosure may be disposed within the support structure and the rigid segments may be disposed about a perimeter of the support structure. Therefore, aspects of the support structure of the present disclosure may be referred to as an "Inverse Tensegrity" or an "Inverse Truss".

One or more joints may disengable and the support structure may be configured to be disposed in a compact or stacked configuration. For example, at least one joint may be configured to disengage adjacent rigid segments and joints may be disposed between rigid segments which may be pivoted in alternating directions thus disposing the rigid segments in a stacked configuration. Such a stacked configuration may be advantageous during transportation of the support structure.

In at least one aspect, the support structure is configured to provide support for assemblies such as habitable structure(s) for use in a low or zero gravity environment. For example, providing a support structure with a radius of about 700 feet and rotating it about a center axis at about 2 rpm may provide a centripetal force of about 1 G about its perimeter. Habitats, work areas, rotation means and transit means (e.g. rocket engines, mass ejectors or jet engines retrofitted to accept compressed oxidant via a SCBA type pressure regulator), storage facilities, laboratories, and other ancillary devices, assemblies, and/or structures may be supported on the inner and/or outer circumferential surface of the support structure.

Figure 1:
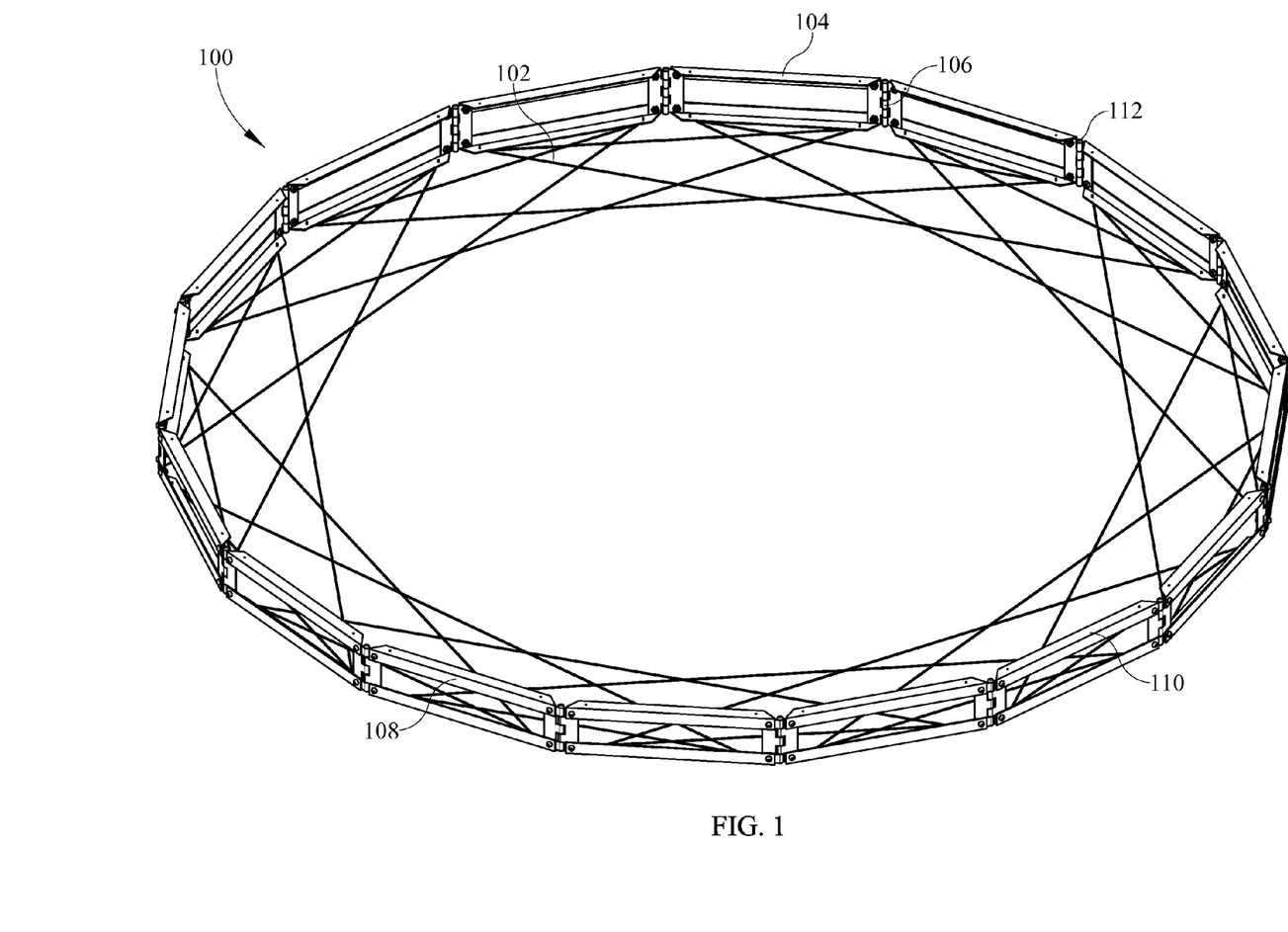
FIG. 1 is a perspective view of a polygonal support structure showing the disposition of features thereof.

FIG. 1 shows polygonal support structure 100 and the disposition of features thereof. Polygonal support structure comprises a plurality of rigid segments 104. Each rigid segment 104 is joined at longitudinal ends to adjacent rigid segments 104. Joints 106 are affixed to at least one end of each rigid segment 104 and may be configured to hingedly, rotatingly, or fixedly join each rigid segment 104 to an adjacent rigid segment 104 to form polygonal support structure 100. Each joint 106 may be spaced about polygonal support structure 100 by a substantially equal distance.

At least two flexible members 102 are disposed to provide tension between each joint 106 and joints 106 spaced two rigid segments 104 therefrom, in each direction, about polygonal support structure 100. Flexible members 102 may be cables, wires, lines, chains, or other apparatuses or materials as are known in the art that may have a desired tensile strength. Advantageously, flexible members 102 may be coiled, wound, folded, or otherwise disposed in a compact configuration as may be desired for transport.

In at least one aspect, polygonal support structure 100 comprises at least five rigid segments 104 and at least ten flexible members 102. For example, the aspect of polygonal support structure 100 shown in FIG. 1 may have sixteen rigid segments 104 and thirty two flexible members 102. However, it is to be understood that polygonal support structure 100 may have fewer than five or more than sixteen rigid segments 104, for example polygonal support structure 100 may comprise a hundred or more rigid segments 104.

Each rigid segment 104 may be joined at longitudinal ends to adjacent rigid segments 104 forming polygonal support structure 100 and each flexible member 102 may be disposed in a substantially common plane. For example, rigid segment may comprise longitudinal support members 108 with inward extending flanges 110 forming "L-Beam" shaped longitudinal support members 108. Each flexible member 102 may extend from an opening 120 (shown in FIG. 3) in a flange 110 disposed on a common axial end of polygonal support structure 100. However, it is to be understood that flexible members 102 may extend from joints 106, or from portions of polygonal support structure 100 proximate joints 106, and may or may not be disposed in a common plane.

Polygonal support structure 100 may have at least three flexible members 102 configured and disposed to provide tension between each joint 106 and joints 106 spaced therefrom. For example, a flexible member 102 may extend from a joint 106 or proximate a joint 106 to or proximate joints 106 spaced two and four rigid segments 104 therefrom, in each direction, about polygonal support structure 100. However, it is to be understood that more or less than two flexible members 102 may extend from or proximate joints 106 in each direction and there need not be the same number of flexible members 102 extending in different directions. In at least one aspect of polygonal support structure 100, no flexible members 102 are disposed to pass through a center of rotation of polygonal support structure 100. In at least one other aspect of polygonal support structure 100, each flexible member 102 has each end thereof disposed with or proximate a joint 106.

Figure 2:
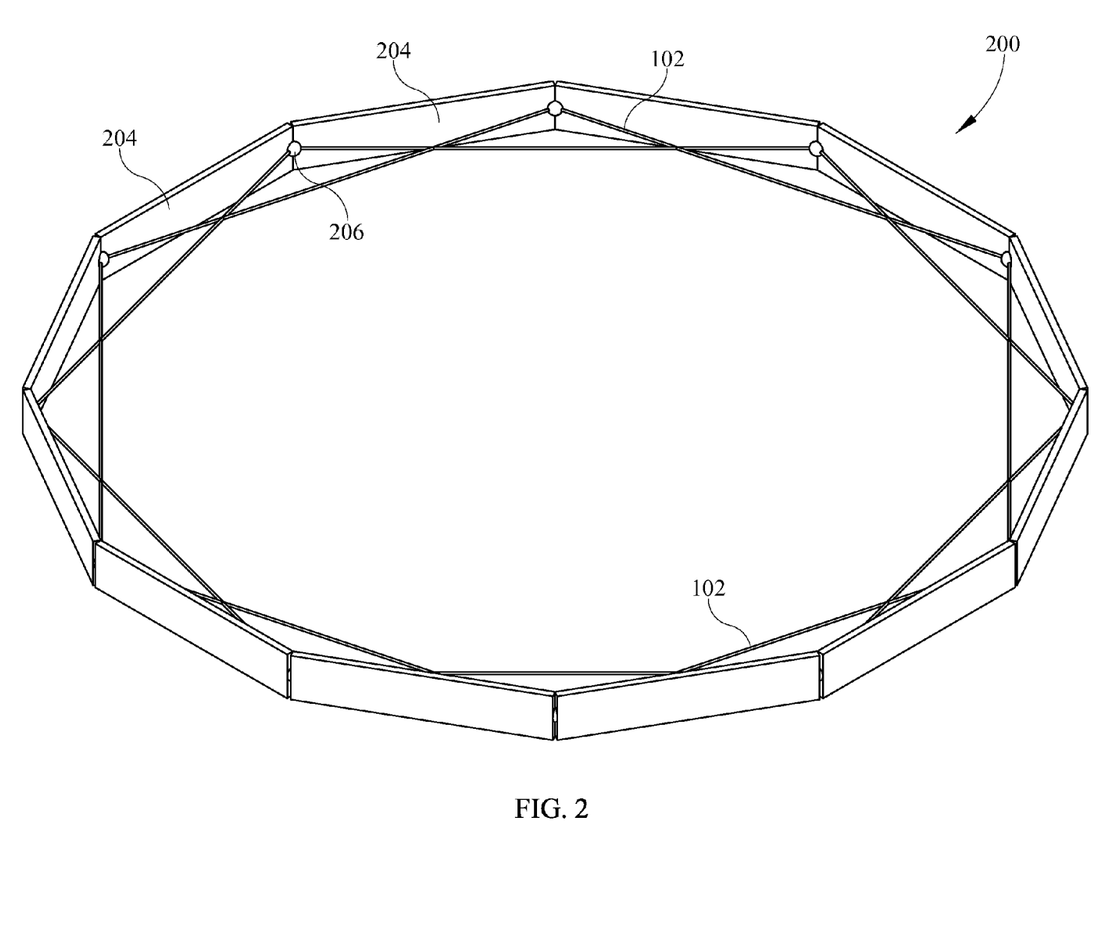
FIG. 2 is a perspective view of an alternative aspect of a polygonal support structure showing the disposition of features thereof.

FIG. 2 shows polygonal support structure 200 and the disposition of possible features and component parts thereof. Polygonal support structure 200 has a plurality of rigid segments 204 joined together at ends thereof. Rigid segments 204 may be planar and may be solid unitary members. Rigid support members 204 may comprise metallic, polymeric, or other materials as are known in the art configured to provide a desired rigidity. Polygonal support structure 200 may be characterized as a circular support structure as a plurality of rigid segments 204 imparts a circular configuration to polygonal support structure 200. In at least one aspect of support structure 200, each rigid segment 204 may have an arc configuration, as shown in FIG. 9G, imparting circular perimeter to circular support structure 200.

Support structure 200 comprises a plurality of joints 206, each joint 206 may be configured and disposed to join two adjacent rigid segments 204 to form support structure 200. Rigid segments 204 may be rotatingly joined, e.g. with a ball and socket, hingedly joined, e.g. with a hinge, or fixed to adjacent rigid segments to form structure 200. For example, joints 206 may be ball and socket or spheroidal joints, disposing rigid segments 204 with the ability to be rotated about a longitudinal axis thereof.

A plurality of flexible members 102 are configured and disposed to provide tension between each joint 206 and at least joints 206 spaced two rigid segments 204 therefrom, in each direction, about support structure 200. It is to be understood that flexible members 102 may be attached at distal ends to joints 206 or to rigid segments 204. Additionally, flexible members 102 may be attached proximate a latitudinal center of rigid segments 204, as shown in FIG. 2, or may be attached proximate a latitudinal end of rigid segments 204. In at least one aspect of the support structure of the present disclosure, each joint has at least one flexible member 102 attached proximate each joint 206.

Rigid segments 204 may have a configuration selected from the group consisting of linear, convex, concave, rectangular, angular, and compound configurations, examples of which are shown in FIGS. 9A-9G. Support structure of 200 may have joints 206 configured and disposed to fixedly, hingedly or rotatingly join each adjacent rigid segment 204. Support structure 200 may have each end of each flexible member 102 disposed with or proximate a joint 206.

Figure 3:
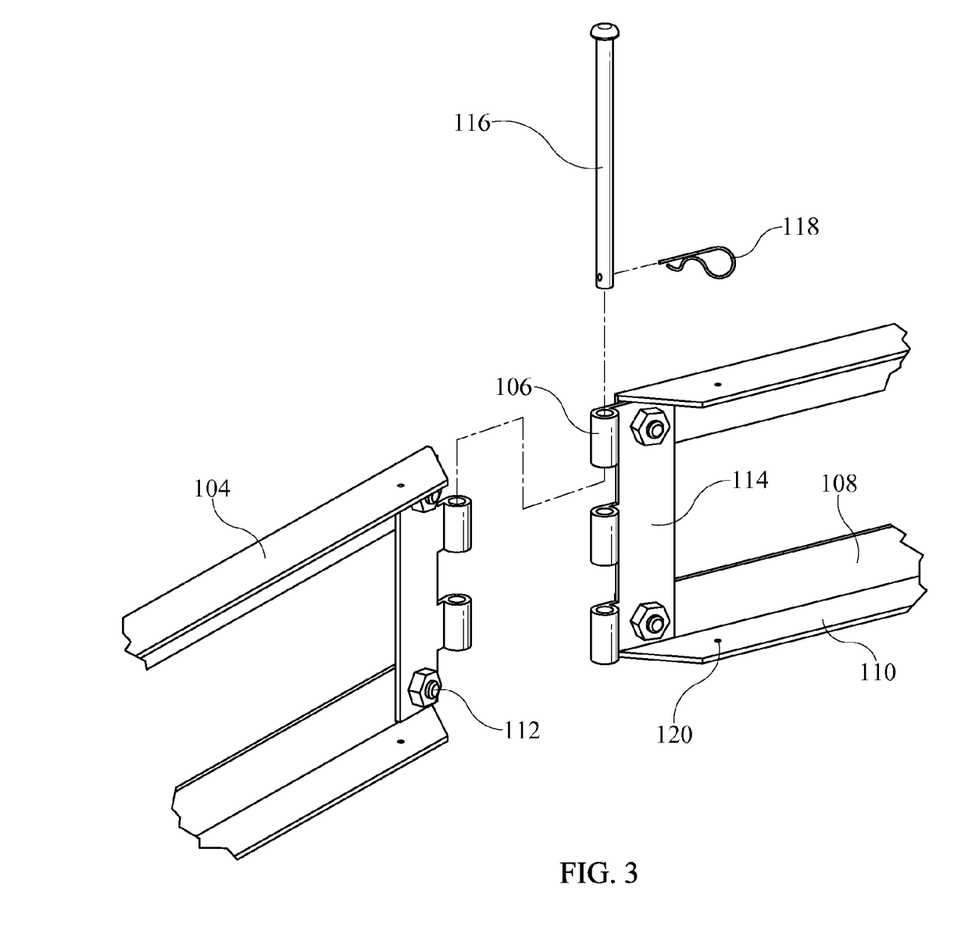
FIG. 3 is an exploded view of an aspect of a joint that may be disposed between longitudinal ends of adjacent rigid segments.

FIG. 3 shows an aspect of a joint 106 that may be disposed between longitudinal ends of adjacent rigid segments 104. Joint 106 may have a hinge configuration and may extend from or be unitary with cross support members 114. However, it is to be understood that joints 106 may comprise a ball and socket joint, fixed joint, or other joining means as known in the art. For example, rigid segments 104 may be fixedly joined wherein joints 106 are fixed joints having a fixed configuration, maintaining rigid segments 104 in a fixed orientation with respect to one another. Rigid segments 104 may comprise two cross support members 114 disposed between two longitudinal support members 108 which may be configured join longitudinal support members 108 together in a parallel configuration. Cross support members 114 may be fastened to longitudinal support members 108 with fasteners 112. Each longitudinal support member may have a flange 110 extending inwardly or outwardly, with respect to a support structure, configured to impart a higher degree of rigidity and/or strength to rigid segment 104. Flanges 110 may have an opening 120 therein configured and disposed to receive a flexible member 102. In at least one aspect of the present disclosure, openings 102 are disposed proximate joints 106. Pin 116 may be configured to be disposed in hinge loops in joints 106, providing a hinge connection between adjacent rigid segments 104. Fastener 118 may be configured to hold pin 116 in the hinge loops. Fasteners 112 and 118 may comprise nuts, bolts, screws, cotter keys, welds, adhesives, or other fastening means as are known in the art.

In at least one aspect of the present disclosure, at least one of joints 106 in a polygonal or circular support structure may be configured to join and un-join two adjacent rigid segments 104. For example, at least one joint may comprise a hinge with a removable pin 116.

Figure 4:
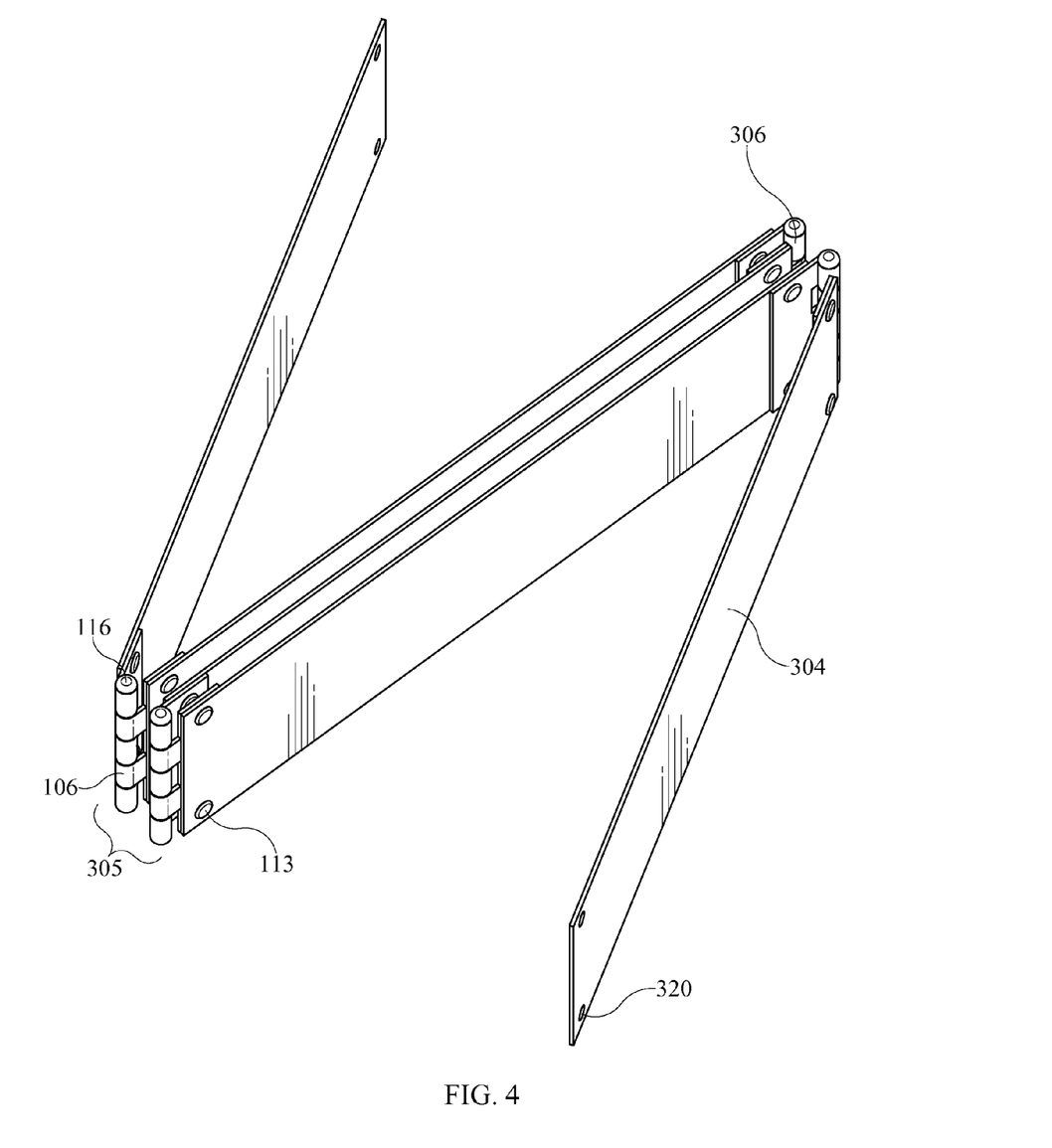
FIG. 4 is a perspective view of an aspect of a polygonal support structure having a stackable configuration.

FIG. 4 shows an aspect of a polygonal support structure having a stackable configuration. Rigid segments 304 and joints 306 may be configured and disposed to enable stacking of each said rigid segment 304 into a compact configuration which may be advantageous for transporting a support structure. For example, at least one joint 306 may be configured to join and un-join adjacent rigid segments 304 and other joints 306 may be configured and disposed to enable stacking of rigid segments 304 in a zigzag configuration, as shown with stacked portion 305. Fasteners disposed to secure joints 106 to rigid segments 304 may be low profile fasteners 113 which may enable rigid segments 304 to be stacked into a close configuration. Alternatively, fasteners 113 may be counter sunk into joints 306 and rigid segments 304 or may be offset to miss-align upon stacking. At least one removable joint 306 may be configured to be removed from rigid segments 304 with the removal of fasteners 113 from openings 320. In at least one aspect, separation of adjacent rigid segments 304 may be accomplished with the removal of pin 116 from a joint 306. In this aspect, the at least one joint 306 configured to join and un-join adjacent rigid segments 304 may remain attached to the rigid segments 304.

Figure 5:
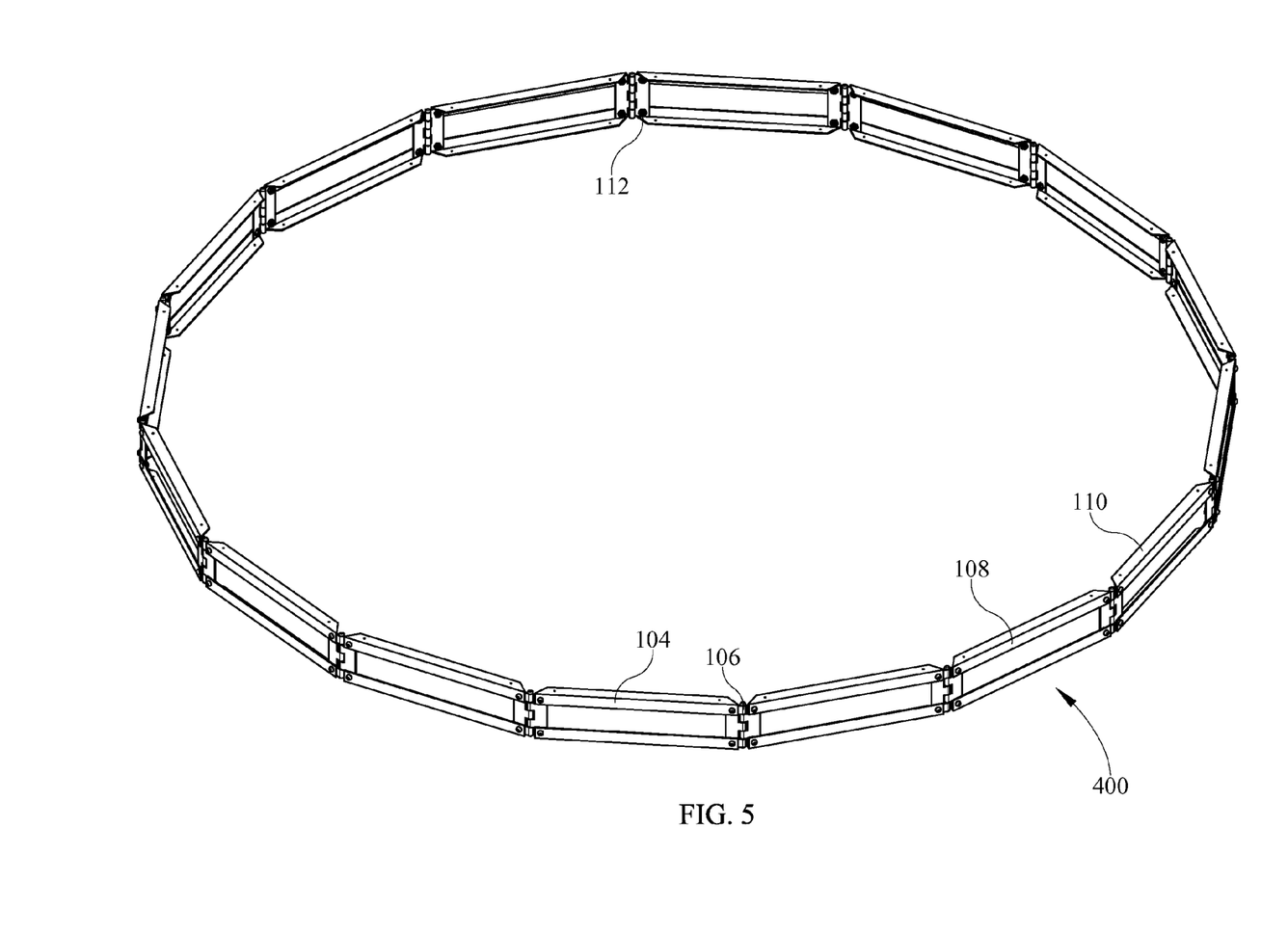
FIG. 5 is a perspective view of a polygonal support structure configured to provide support for assemblies in a substantially weightless environment.

FIG. 5 shows polygonal support structure 400 configured to provide support for assemblies in a substantially weightless environment. The polygonal support structure comprises a plurality of rigid segments 104, each configured to support one or more assemblies. The support structure also comprises a plurality of joints 106, each joint 106 may be configured to join two adjacent rigid segments 104 together to form the polygonal support structure. Each rigid segment may comprise a pair of longitudinally extending support members 108 joined to joints 106 with fasteners 112. Each longitudinally extending support member 108 may have a flange 110 configured and disposed to increase strength and/or rigidity to each rigid segment 104.

In this aspect of a polygonal support structure, support may be provided to assemblies in a weightless or substantially weightless environment. For example, the support structure may be stacked and transported into space and assembled into a polygonal support structure. Force may then be applied to the support structure to rotate the support structure about a central axis of rotation. Having a substantially equivalent weight distribution about a perimeter of the support structure may facilitate the support structure to maintain a polygonal configuration. Alternatively, radial force(s) may be applied to one or more rigid segments 104 and/or joints 106 to facilitate the support structure in maintaining a polygonal shaped support structure.

Figure 6:
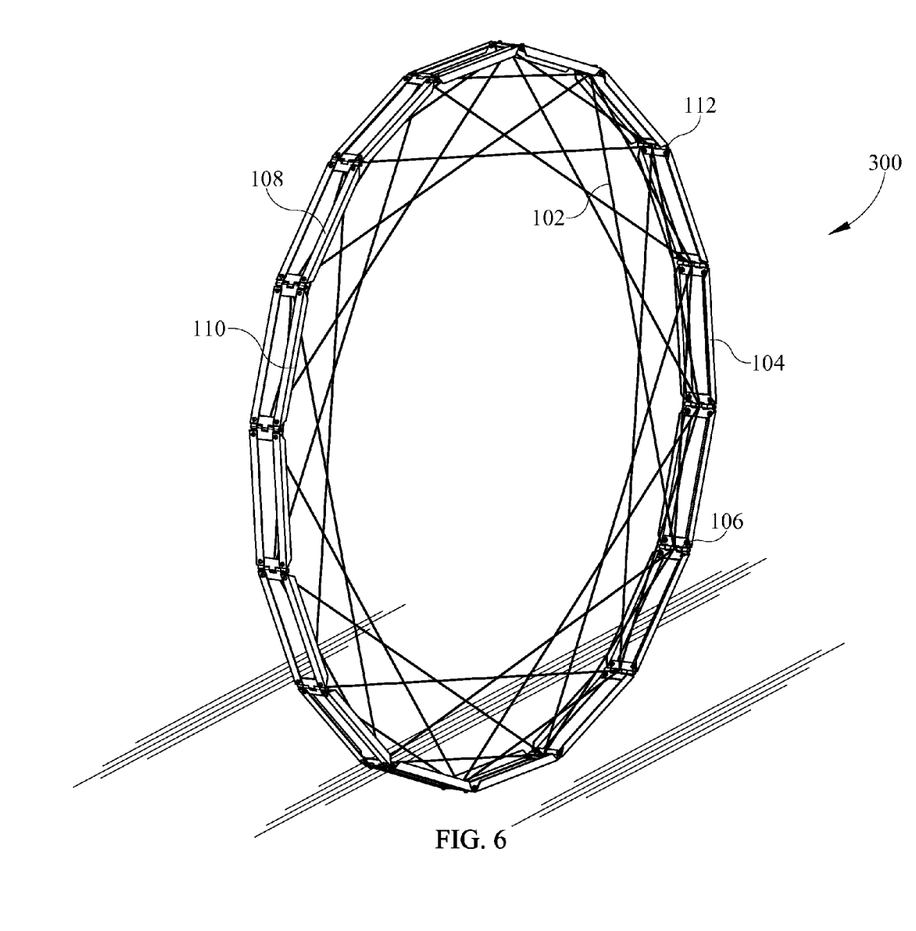
FIG. 6 is a perspective view of a polygonal support structure comprising more than one flexible member extending from proximate a joint toward joints in a common direction about the polygonal support structure.

FIG. 6 shows polygonal support structure 300 which may be configured to provide support in a gravitational environment. Polygonal support structure 300 comprises at least two flexible members 102 extending from proximate each joint 106, flexible members 102 may be configured and disposed to provide tension between each joint 106 and joints 106 spaced two segments 104 therefrom, in each direction, about polygonal support structure 300. In the aspect shown in FIG. 6, four flexible members 102 extend from proximate each joint 106, flexible members 102 may be configured and disposed to provide tension between each joint 106 and joints 106 spaced two and four segments 104 therefrom, in each direction, about polygonal support structure 300. However, it is to be understood that two or more flexible members 102 may extend from or proximate each joint 106. Flexible members 102 may be configured and disposed to provide tension between each joint 106 and joints 106 spaced therefrom, in each direction, about polygonal support structure 300. Each terminal end of each flexible member 102 may be disposed with or proximate a joint 106 and there need not be an even number of flexible members 102 disposed with or proximate each joint 106 as a different number of flexible members 102 may be disposed to provide tension between each joint 106 and joints 106 spaced in different directions therefrom.

Figure 7:
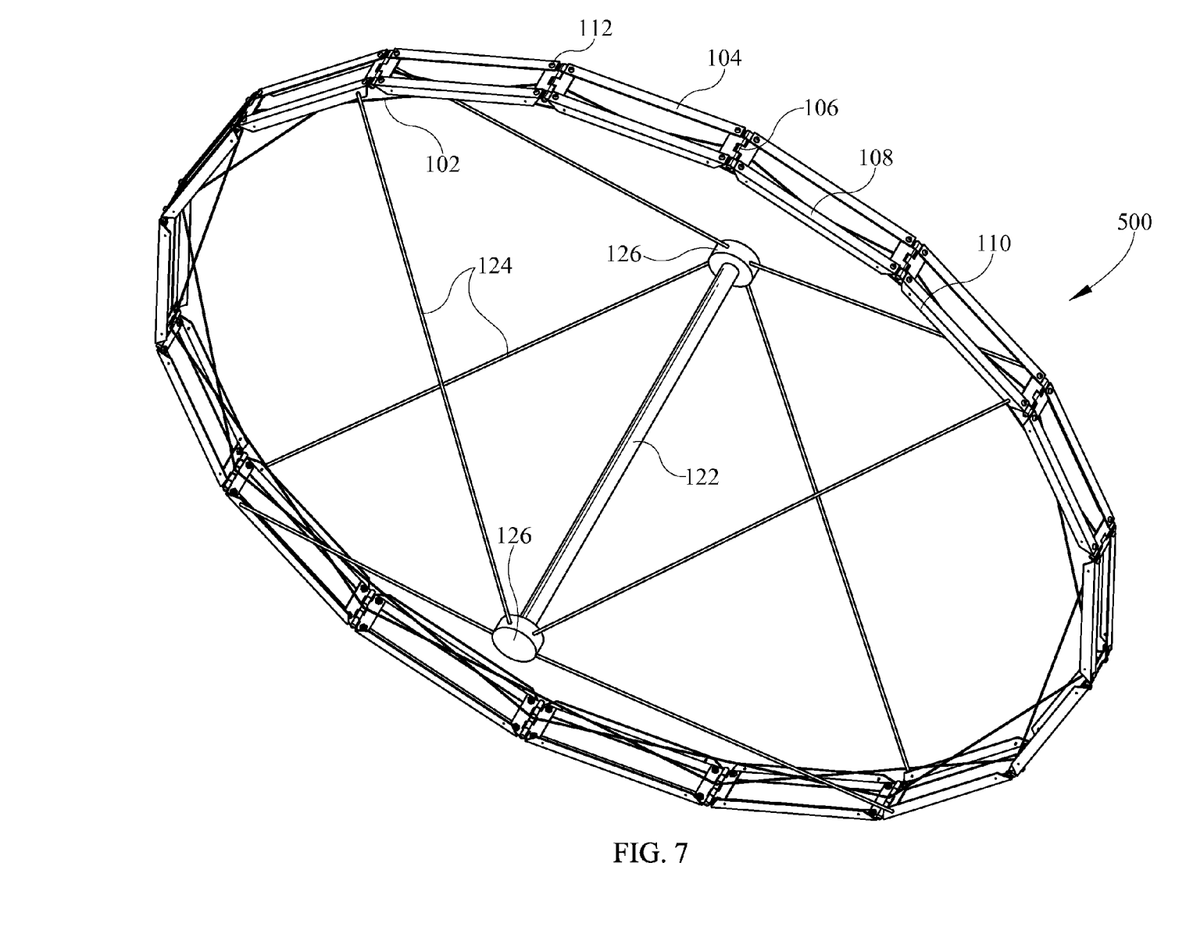
FIG. 7 is a perspective view of a polygonal support structure having an axial member.

FIG. 7 shows polygonal support structure 500 having an axial member 122. Axial member 122 is disposed to extend through a central axis of rotation of polygonal support structure 500. A first terminal end of axial member 122 may be joined to polygonal support structure 500 with at least two joining members 124 extending from the first terminal end and extending to polygonal support structure 500 at substantially equidistantly spaced points about polygonal support structure 500. A second terminal end of axial member 122 may be joined to polygonal support structure 500 with at least two joining members 124 extending from the second terminal end and extending to polygonal support structure 500 at substantially equidistantly spaced points thereabout. In the aspect shown in FIG. 7, four joining members 124 are attached to each terminal end of axial member 122 with anchors 126 and extend to polygonal support structure 500 at substantially equidistantly spaced points thereabout. Advantageously, joining members 124 are disposed with polygonal support structure with joints 106. Axial member 122 may be configured to provide additional strength and/or stability to polygonal support structure 500.

Figure 8:
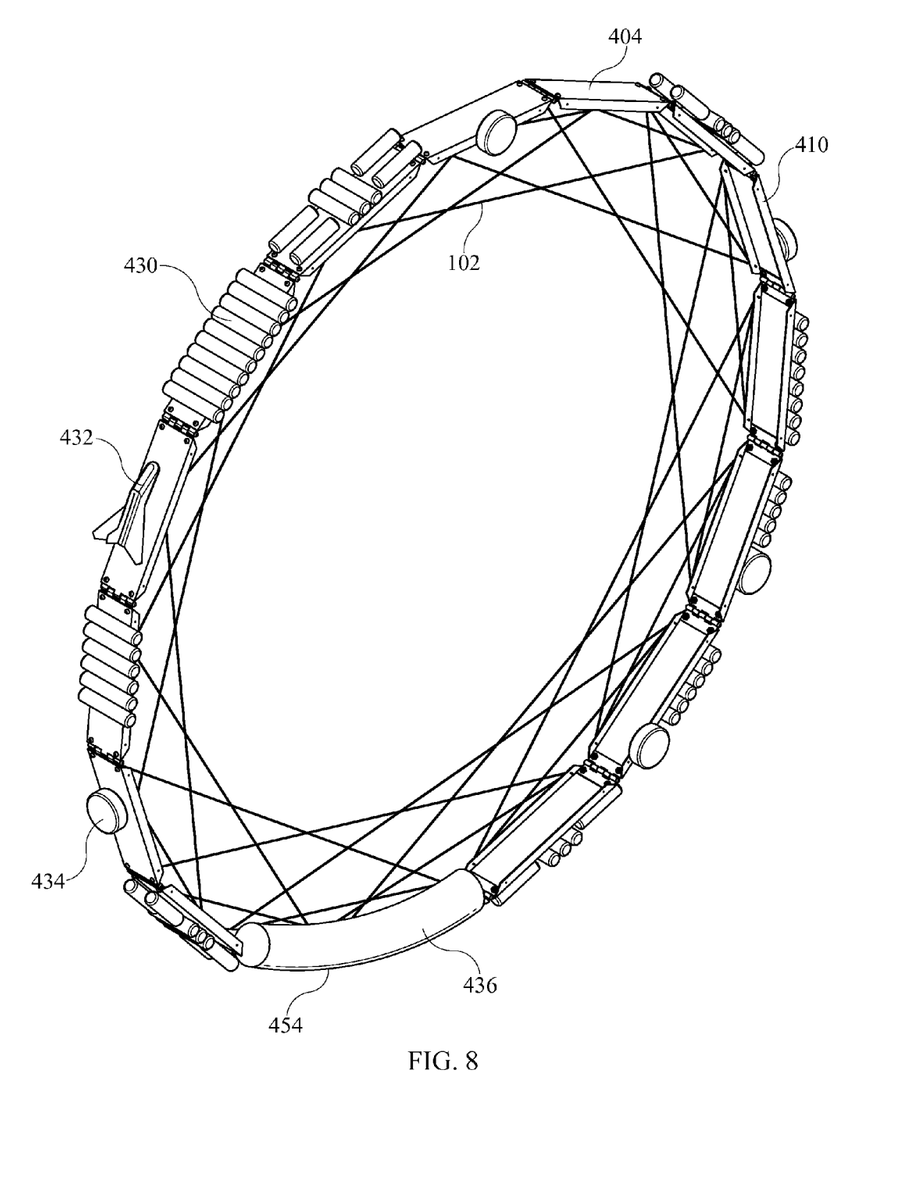
FIG. 8 is a perspective view of a polygonal support structure supporting assemblies in a substantially weightless environment.

FIG. 8 shows a polygonal support structure supporting a variety of assemblies in a substantially weightless environment. The assemblies may be supported on an inner or outer perimeter of the support structure with rigid segments 404. Additionally, assemblies may be supported with edges of rigid segments 404. For example, space vehicle 432 may dock with a rigid segment 404, work or habitable structures 434 may be supported with rigid segments 404, and tubular structures 436 as well as storage containers 430 may be supported with rigid segments 404. It is to be understood that other assemblies, for example angular assemblies, as are known in the art may be supported with rigid segments 404. In at least one aspect, a polygonal support structure may be configured and disposed to support a plurality of assemblies in a substantially weightless environment and may be configured to impart artificial gravity to the plurality of assemblies upon rotation of the polygonal support structure about a central axis of rotation. The central axis of rotation of the polygonal support structure may be substantially perpendicular to a common plane of each rigid segments 404. For example, the polygonal support may be configured to support assemblies in a substantially weightless environment and to provide a centripetal force to assemblies supported therewith. The polygonal support structure of the present disclosure may be configured to provide no or any amount of centripetal force to assemblies supported therewith. For example, an aspect of a polygonal support structure of the present disclosure may be configured to provide less than 1 G, about 1 G, or more than 1 G about its perimeter upon rotating it about its center of gravity or axis of rotation.

Figure 9A:
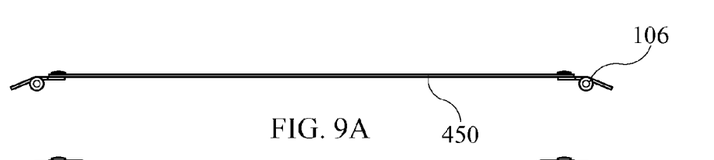
FIGS. 9A-9G show aspects of configurations of rigid segments that may be disposed with a polygonal support structure.
Figure 9B:
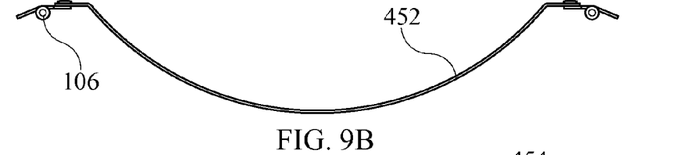
Figure 9C:
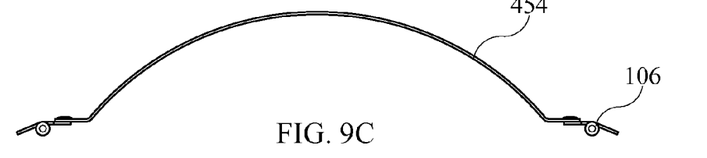
Figure 9D:
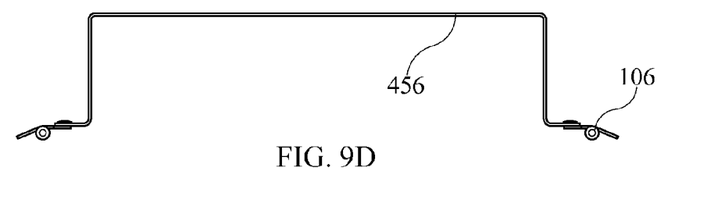
Figure 9E:
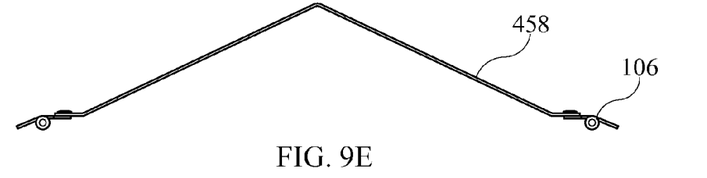
Figure 9F:
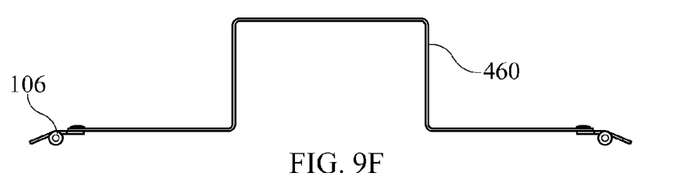
Figure 9G:
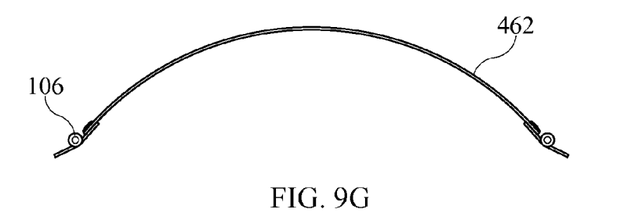

FIGS. 9A-9G show aspects of configurations of rigid segments that may be disposed with a polygonal support structure. The rigid segments may have a variety of configurations, for example FIG. 9A shows linear rigid segment 450, FIG. 9B shows concave rigid segment 452, FIG. 9C shows convex rigid segment 454, FIG. 9D shows rectangular rigid segment 456, FIG. 9E shows angular rigid segment 458, and FIG. 9F shows rigid segment 460 having a compound configuration. FIG. 9G shows rigid segment 462 comprising a formed shape extending between each joint 106. Other configurations of rigid segments may be disposed with a support structure of the present disclosure and a support structure may dispose similar and differently configured rigid segments. Additionally, rigid segments may have a variety of compound configurations, such as the linear and rectangular rigid segment 460 shown in FIG. 9F. For example, one or more rigid segments may comprise an angular portion and a linear portion. Additionally, a polygonal support structure of the present disclosure may dispose one or more rigid segments having a configuration selected from the group consisting of linear, convex, concave, rectangular, angular, and compound configuration. It is to be understood that aspects of the support structure disclosed herein may support other configurations of rigid segments as are known in the art.

The invention is illustrated by example in the drawing figures, and throughout the written description. It should be understood that numerous variations and additions to the present disclosure are possible while adhering to the inventive concept. Such variations are contemplated as being a part of the present disclosure. For example, a support structure in the form of a polygon or hoop, with rigid segments either hinged (with multiple degrees of freedom) or rigidly fixed one to the next (which may have a radius of 700 feet, which, if rotated at 2 rpm, may generate centripetal force of 1 G), where the shape of the polygon may be maintained by flexible members such as cables.

In at least one aspect of the present disclosure, the rigid segments may not in compression and the flexible members or cables may not be in tension. The cables may be within the structure and the rigid segments may be about a perimeter of the structure. The support structure disclosed herein may have a special application to weightless (or light gravity and floating) environments and may be used in gravity influenced environments.

A motive means may be supported with aspects of the present disclosure. For example, rotating a support structure about a central axis of rotation may subject assemblies attached thereto to centripetal force which will may greatest along the vertices of the polygon formed by the rigid segments, and slightly less at the center of these members. If the rotation is sufficiently fast, the centrifugal force along the polygon may approach or exceed the force of one earth gravity. A polygonal support structure may be configured to provide a centripetal force of less than, more than, or about 1 G about its perimeter upon rotating it about its center of gravity. For example, in at least one aspect, a polygonal support structure may have a radius of about 700 feet, wherein upon rotating about 2 rpm about a central axis of rotation, approximately 1 G of force may be imparted to assemblies attached to a perimeter thereof. In a weightless situation, rotation may be accomplished by two or more mass ejection engines, located tangentially along rigid segments. Oppositely positioned mass ejection engines may be used to adjust or stop rotation if desired. In at least one aspect, a mass ejection may be a conventional jet engine, retrofitted to accept compressed air via a self contained breathing apparatus (SCBA) type pressure regulator enabling it to be operated in a vacuum.

Aspects of the support structure may comprise a transit means. For example, in a weightless environment, one or more engines, mass ejection engines for example, may be configured and disposed to move the support structure in any or all three directions. For example, one or more engines may be disposed with a support structure to provide a force vector perpendicular to or in line with an axis of rotation thereof.

In at least one other aspect of the present disclosure, component parts of the support structure may be sized and configured to be launched into earth orbit by delivery vehicle or space cannon to stable orbit (preferably geosynchronous). A space cannon delivery device may or may not comprise a booster for delivery of the support structure. However, other methods of launch may be acceptable. Additionally, the support structure may be configured for assembly by remotely controlled machines.

The support structure disclosed herein may be configured to support a variety of assemblies. For example, habitats, life support and other facilities may be attached thereto for crew/technicians/engineers/scientists. The support structure may be configured to support one or more mechanics bays, propulsion bays, various storage and resource facilities, one and two man runabouts, mars and moon landing devises, laboratories, smelters, docking and landing facilities for larger spacecraft and reentry vehicles, and nuclear reactors, for example. The support structure may be configured to support an organic chemical cracking lab configured to process organic compounds that may be available on moons of Saturn and Jupiter. Smelters to reprocess metals from discarded satellites, construction materials, etc., may also be disposed with aspects of the support structure disclosed herein. The support structure may comprise one or redundant computer systems configured to monitor and adjust element stresses and trim the support structure by adjusting flexible member tension and/or configured to monitor and control rotation, movement, or other maneuvers of the support structure. One or more pressure regulators (scba type) may be configured to permit jet engines to be fueled by compress air or oxygen and fuel in canister form may be supported by aspects of the support structure disclosed herein. Remotely controlled construction machines, habitats for crew/technicians/engineers/scientists, life support and facilities, and other assemblies may be supported with aspects of the support structure. Mechanics bays for the repair of the support structure, its elements, flexible members, rigid segments, and other equipment may be supported with aspects of the support structure. Propulsion bays and docking facilities for crew from earth launched rockets are other examples of assemblies that may be supported with aspects of the support structure disclosed herein. It is to be understood that other and additional assemblies may be supported with the support structure disclosed herein.

AT LEAST A PARTIAL LIST OF NOMENCLATURE

100 Polygonal Support Structure
102 Flexible Member
104 Rigid segment
105 Opening
106 Joint
108 Longitudinal Support Member
110 Flange
112 Fastener
113 Low Profile Fastener
114 Cross Support Member
116 Pin
118 Fastener
120 Opening
122 Axial Member
124 Joining Member
126 Anchor
200 Polygonal Support Structure
204 Rigid segment
206 Joint
300 Polygonal Support Structure
304 Rigid segment
305 Collapsed Portion of Rigid segments
306 Joint
320 Opening
400 Polygonal Support Structure
404 Rigid segment
430 Storage Container
432 Space Vehicle
434 Structure
436 Tubular Structure
450 Linear Rigid Segment
452 Concave Rigid Segment
454 Convex Rigid Segment
456 Rectangular Rigid Segment
458 Angular Rigid Segment
460 Compound Configuration Rigid Segment
462 Arc Rigid Segment
500 Polygonal Support Structure

The invention claimed is:

1. A polygonal support structure configured to support at least one structure or assembly in a substantially weightless environment comprising:
    a plurality of rigid segments;
    each said rigid segment being configured to be joined at longitudinal ends to adjacent rigid segments;
    a joint affixed to at least one end of each said rigid segment, each said joint being configured to rotatingly join each said rigid segment to an adjacent rigid segment to form said polygonal support structure; and
    a plurality of flexible members configured and disposed to provide tension between each said joint and joints spaced two segments therefrom, in each direction, about said polygonal support structure.

2. The polygonal support structure of claim 1 wherein each said rigid segment has a configuration selected from the group consisting of linear, convex, concave, rectangular, angular, and compound configuration.

3. The polygonal support structure of claim 2 wherein each said joint is spaced about said polygonal support structure by a substantially equal distance.

4. The polygonal support structure of claim 3 comprising at least at least two flexible members configured and disposed to provide tension between each said joint and joints spaced two segments therefrom, in each direction, about said polygonal support structure.

5. The polygonal support structure of claim 4 wherein at least one of said joints is configured to join and un-join two said rigid segments; and
    each said rigid segment and each said joint is configured to enable stacking each said rigid segment into a compact configuration.

6. The polygonal support structure of claim 2 wherein each said rigid segment is joined at longitudinal ends to adjacent rigid segments forming said polygonal support structure and each said flexible member is disposed in a substantially common plane.

7. The polygonal support structure of claim 6 wherein each said joint has at least three flexible members configured and disposed to provide tension between each said joint and joints spaced therefrom.

8. The polygonal support structure of claim 6 wherein none of said flexible members passes through a center of rotation of said polygonal support structure.

9. The polygonal support structure of claim 6 configured to provide a centripetal force of about 1 G about its perimeter upon rotating it about its center of gravity.

10. A polygonal support structure configured to support at least one structure or assembly in a substantially weightless environment comprising:
    a plurality of rigid segments, each said rigid segment being configured to support one or more assemblies;
    a plurality of joints, each said joint being configured to hingedly or rotatingly join two of said plurality of rigid segments together to form said polygonal support structure having hinging or rotating joints.

11. The polygonal support structure of claim 10 further comprising at least one flexible member for each said joint, said at least one flexible member being configured and disposed to provide tension between each said joint and joints spaced two segments therefrom, in each direction, about said polygonal support structure.

12. The polygonal support structure of claim 11 wherein none of said flexible members are disposed within a central axis of rotation of said polygonal support structure.

13. The polygonal support structure of claim 11 further comprising an axial member extending through a central axis of rotation of said polygonal support structure, a first terminal end of said axial member being joined to said polygonal support structure with at least two joining members extending from said first terminal end and extending to said polygonal support structure at substantially equidistantly spaced points thereabout, and a second terminal end of said axial member being joined to said polygonal support structure with at least two joining members extending from said second terminal end and extending to said polygonal support structure at substantially equidistantly spaced points thereabout.

14. The polygonal support structure of claim 10 configured and disposed to support a plurality of assemblies and to impart artificial gravity to said plurality of assemblies upon rotation of said polygonal support structure about a central axis of rotation, said central axis of rotation of said polygonal support structure being substantially perpendicular to a common plane of each said rigid segments.

15. A circular support structure configured to support at least one structure or assembly in a substantially weightless environment comprising:
 a plurality of rigid segments;
 a plurality of joints, each said joint being configured and disposed to join two adjacent said rigid segments to form said circular support structure; and
 a plurality of flexible members configured and disposed to provide tension between each said joint and at least joints spaced two segments therefrom, in each direction, about said circular support structure.

16. The circular support structure of claim 15 wherein each said rigid segment has a configuration selected from the group consisting of linear, convex, concave, rectangular, angular, and compound configuration.

17. The circular support structure of claim 16 wherein said joints are configured and disposed to hingedly or rotatingly join each said adjacent rigid segment.

18. The circular support structure of claim 16 wherein at least one of said joints is configured to join and un-join said adjacent rigid segments and each said rigid segment and each said joint is configured to enable stacking each said rigid segment into a compact configuration.

19. The circular support structure of claim 16 wherein each said flexible member has each terminal end disposed with or proximate one of said joints.

20. A kit for making the polygonal support structure of claim 1 comprising:
 at least four said rigid segments;
 at least four said joints; and
 at least two said flexible members.

* * * * *